(12) United States Patent
Wang et al.

(10) Patent No.: US 8,184,505 B1
(45) Date of Patent: May 22, 2012

(54) HIGH SENSITIVITY GPS-ASSISTED TIME SOURCE

(75) Inventors: Yi-Hsiu Wang, Palo Alto, CA (US);
Dennis Hilgenberg, San Jose, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 0 days.

(21) Appl. No.: 13/070,423

(22) Filed: Mar. 23, 2011

Related U.S. Application Data (62) Division of application No. 11/968,620, filed on Jan. 2, 2008, now Pat. No. 7,936,642.

(51) Int. Cl.
 *G04C 11/02* (2006.01)
 *G01S 19/24* (2010.01)
 *G01S 19/30* (2010.01)

(52) U.S. Cl. .......... 368/47; 342/357.63; 342/357.69; 375/150

(58) Field of Classification Search .......... 368/47; 342/357.01, 357.03, 357.06, 357.08, 357.12, 342/357.62, 357.63, 357.69; 375/142, 145, 375/150, 343, 368
See application file for complete search history.

(56) References Cited

U.S. PATENT DOCUMENTS

| | | | |
|---|---|---|---|
| 5,648,982 A | 7/1997 | Durrant et al. | |
| 5,893,044 A * | 4/1999 | King et al. | 701/478 |
| 5,953,370 A | 9/1999 | Durrant et al. | |
| 6,055,265 A | 4/2000 | Kim | |
| 6,295,023 B1 * | 9/2001 | Bloebaum | 342/357.62 |
| 6,317,452 B1 | 11/2001 | Durrant et al. | |
| 6,346,911 B1 | 2/2002 | King | |
| 6,380,891 B1 * | 4/2002 | Yamashita | 342/357.58 |
| 6,417,801 B1 | 7/2002 | van Diggelen | |
| 6,429,811 B1 * | 8/2002 | Zhao et al. | 342/357.66 |
| 6,768,451 B2 | 7/2004 | Akopian et al. | |
| 6,775,802 B2 | 8/2004 | Gaal | |
| 6,898,234 B1 | 5/2005 | Yu et al. | |
| 7,053,826 B1 | 5/2006 | McBurney et al. | |
| 7,197,064 B2 | 3/2007 | Loomis et al. | |
| 7,348,921 B2 | 3/2008 | Yu | |
| 7,447,253 B2 | 11/2008 | Abraham et al. | |
| 7,720,104 B2 | 5/2010 | Rao | |
| 2005/0174284 A1 | 8/2005 | Abraham et al. | |
| 2008/0084336 A1 | 4/2008 | Wang et al. | |
| 2008/0304601 A1 | 12/2008 | Abraham et al. | |

* cited by examiner

*Primary Examiner* — Vit Miska
(74) *Attorney, Agent, or Firm* — Bever, Hoffman & Harms, LLP (57) ABSTRACT

A method for determining portions of a GPS satellite signal may use non-coherent integration to determine a repeated pattern such as a preamble. Once the repeated pattern is determined, portions of the GPS satellite signal that may be determined with partial correlation sums. Sensitivity to satellite signals may be increased by computing more partial correlation sums on portions of the GPS satellite signal. In one embodiment, time of day information may be determined from the GPS satellite signal with partial correlation sums.

19 Claims, 9 Drawing Sheets

Sub-frame 1 detail

Figure 4

TLM field detail

Figure 5

HOW field detail

HIGH SENSITIVITY GPS-ASSISTED TIME SOURCE

RELATED APPLICATIONS

This application is a divisional of U.S. patent application Ser. No. 11/968,620, entitled "High Sensitivity GPS-Assisted Time Source" filed Jan. 2, 2008.

BACKGROUND OF THE INVENTION

1. Field of the Invention

Embodiments of the specification generally relate to satellite navigation receivers and more specifically to high sensitivity, GPS-assisted time sources.

2. Description of the Related Art

Satellite navigation systems allow electronic receivers to determine navigational information such as position (latitude, longitude, and altitude), velocity and time. One example of such a system is the United States Navstar Global Positioning System (GPS), which may include up to thirty functional navigation satellites. Other examples of satellite navigation systems include the Russian GLONASS system and the European Galileo system. Satellite navigation receivers, such as GPS receivers typically use GPS data from three or more orbiting satellites to determine navigation information. Only a portion of the satellites within a navigation system may be visible to a particular navigation receiver at a given time.

GPS satellites typically transmit GPS signals on two bands: the L1 band with a carrier frequency of approximately 1575.42 MHz and the L2 band with a carrier frequency of approximately 1227.40 MHz. Traditionally, only authorized users have been able to use data transmitted on the L2 band. In the future, civilian GPS signals may be transmitted on the L2 band and the L5 band (approximately 1176.45 MHz). Typically, low cost GPS receivers receive only on one of these bands. Some civilian GPS receivers may use clock data from the L2 band to refine GPS data carried in the L1 band. The following descriptions use the L1 band to describe exemplary embodiments; however, other embodiments may be implemented using one or more GPS bands or other global positioning signals.

GPS satellites transmit data using a form of spread spectrum coding known as code division multiple access (CDMA). Each satellite may be assigned a coarse acquisition (CA) code that resembles pseudo random noise and is typically unique to that satellite. Each satellite encodes data using the satellite's CA code and transmits encoded data on the L1 carrier frequency (i.e., data is spread using the CA code). Thus, all satellites are simultaneously transmitting data on a shared carrier frequency. Each CA code consists of a sequence of 1023 "chips" where each chip may be assigned a value of one or zero. The CA code is transmitted at a rate of 1.023 MHz; therefore, each chip period is approximately 0.977 us. In some embodiments, a ground-based pseudo-GPS satellite (i.e., a pseudo-lite) may transmit GPS data by using a CA code of a satellite that may be out of view of the GPS receiver. CA code phase is the relationship of a CA code either to a reference clock or to other CA codes transmitted by other satellites. Although the CA code phase may be synchronized between satellites at the time of transmission, the CA codes may be received with differing delays at the GPS receiver due to different and changing propagation times. Typically, a GPS receiver determines which CA codes are being received in order to determine which GPS satellites are in view. Once a GPS signal with a particular CA code is received and identified, the GPS receiver is said to have "acquired" the GPS satellite associated with that CA code. A GPS receiver may also "track" a GPS satellite by continuing to receive a GPS signal from a previously acquired GPS satellite.

Typically, after a GPS receiver acquires four or more GPS satellites, the GPS receiver may determine a position, velocity, and time (PVT) solution. If the GPS receiver can acquire more than four GPS satellites, the PVT solution may be made more accurate. Some GPS receivers may determine a PVT solution with less than four GPS satellites. Such a solution, however, may not be as accurate as a solution determined with four or more GPS satellites.

GPS satellites use relatively low power radio transmitters. For example, a typical GPS satellite may only be rated to 50 W. A typical orbit of a GPS satellite is approximately 14,500 miles above Earth. At that distance, the signal strength of a GPS signal on Earth may be as low as −160 dBm. This signal strength may be well below the thermal noise floor of a GPS receiver. Well-known digital signal processing techniques are typically used to increase signal strength and recover transmitted data from a received GPS signal. Since the GPS signals are relatively weak, receiving GPS signals indoors may be difficult. For example, it may be difficult for GPS signals to penetrate the roof and walls of buildings. Without usable GPS signals, it may be too difficult for a GPS receiver to determine a relatively accurate PVT solution indoors.

Since four or more GPS satellites are typically required to provide a PVT solution, typical GPS receivers generally include multiple acquisition and tracking channels to provide a PVT solution relatively quickly. For example, multiple acquisition channels may acquire a GPS satellite more quickly than a single acquisition channel by distributing the acquisition task across multiple acquisition channels. Similarly, multiple tracking channels may be used to track a plurality of GPS satellites. Because of the nature of the GPS signals, oftentimes a particular GPS signal may fade and reception may be temporarily be lost when the GPS receiver is in motion. By tracking multiple satellites, the loss of a single GPS satellite signal may not hinder the determination of a PVT solution.

Although the multiple acquisition and tracking channels may increase the cost of the GPS receiver, they may reduce the so-called "time to first fix" (TTFF), which is the time required to provide a first PVT solution, typically, after the GPS device is initially powered.

Figure 1:
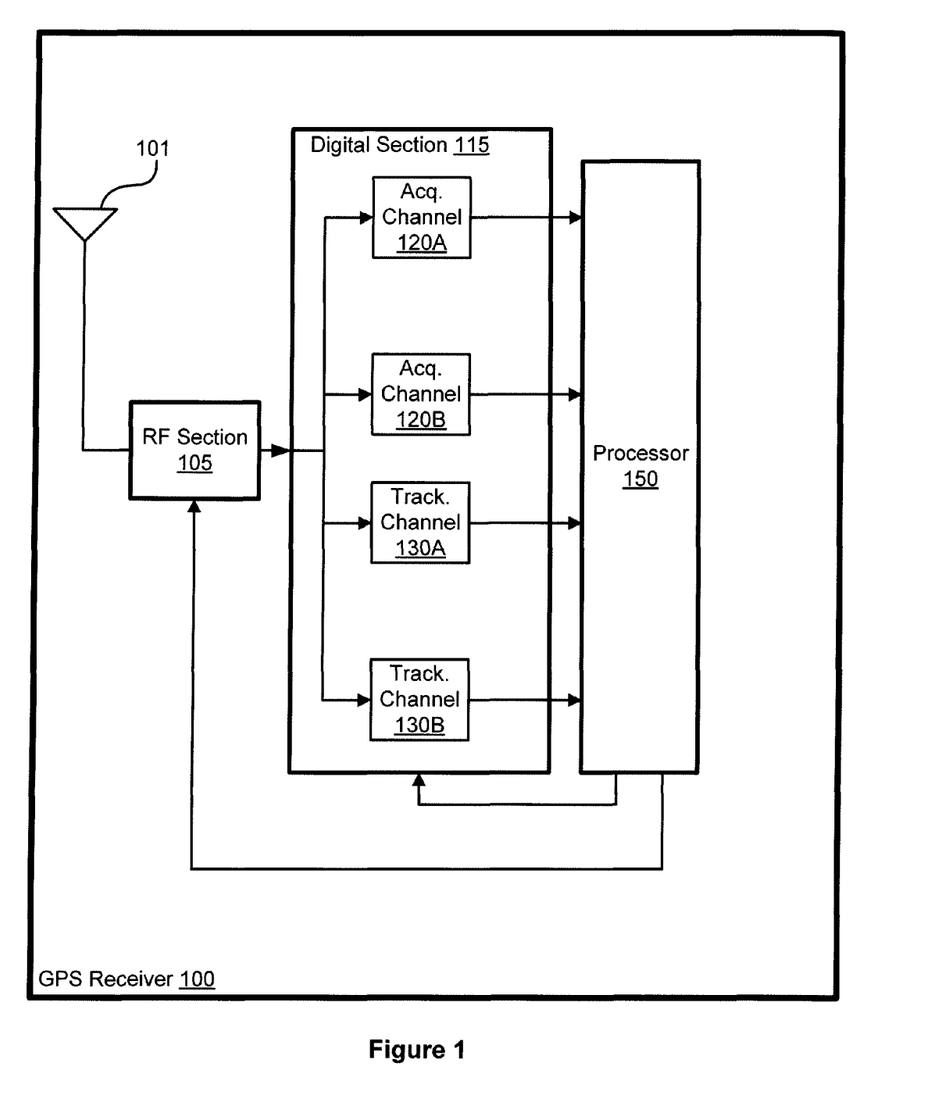
FIG. 1 is a block diagram of a typical GPS receiver.

FIG. 1 is a block diagram of a typical GPS receiver 100. The GPS receiver 100 may include an antenna 101, a radio frequency (RF) section 105, a digital section 115 and a processor 150. The antenna 101 is coupled to the RF section 105. The antenna 101 receives RF signals and provides those RF signals to the RF section 105. The RF signals may include, among other signals, GPS signals transmitted from a GPS source, such as one or more GPS satellites. The RF section 105 may processes the RF signals and may produce an intermediate frequency (IF) signal. In one embodiment, the IF signal may be produced by sampling the RF signal with an analog-to-digital converter (ADC, not shown). The RF section 105 provides the IF signal to the digital section 115.

The digital section 115 may use the IF signal to acquire and track GPS satellites and produce acquisition and tracking data that may be coupled to the processor 150. The digital section 115 includes acquisition channels and tracking channels. In this exemplary embodiment, the digital section 115 includes acquisition channels 120A and 120B and tracking channels 130A and 130B. Other embodiments of the digital section 115 may include more than two acquisition channels and more than two tracking channels. Acquisition channels 120A and 120B may be used to determine if a particular GPS satellite signal may be acquired. As described above, generally, the greater the number of acquisition channels in a GPS receiver, the shorter the TTFF.

Multiple tracking channels enable the GPS receiver 100 to concurrently track multiple GPS satellites and thereby continue to provide a PVT solution especially when one or more GPS signals may temporarily fade or become blocked. For example, if a GPS receiver is tracking five GPS satellites and the GPS signals from one of the GPS satellites is lost, then the GPS receiver may still be able to determine a PVT solution.

The processor 150 receives acquisition and tracking data from the digital section 115 and may determine a PVT solution. The processor 150 may also configure and control the RF section 105 and the digital section 115. For example, the processor 150 may provide gain settings for the RF section 105 or may configure one or more acquisition channels 120A and 120B in the digital section 115.

There are some applications that may benefit from the information contained in GPS signals, but which may not require a full PVT solution. As is well-known, relatively accurate time of day information is carried in GPS signals (specifically in the time-of-week field and the week number field) making the GPS signals a desirable time source. However, increasing the cost of a timepiece with the cost of a GPS receiver may make the cost of a GPS-assisted timepiece unattractive. Furthermore, if the timepiece is located indoors, the relative strength of the GPS signal may be diminished by the walls and roof, thereby increasing the difficulty of using time of day information carried by the GPS signal.

As the foregoing illustrates, what is needed in the art is a high sensitivity GPS receiver that has the ability to extract time of day information from the GPS signal without necessarily determining a full PVT solution.

SUMMARY OF THE INVENTION

A method and apparatus is presented to determine portions of a GPS signal. In one embodiment, time of day information may be determined from the GPS signal without necessarily determining a complete PVT solution. In one embodiment, a signal from a GPS satellite may be received. A position of a preamble in the signal may be determined. In one embodiment, non-coherent integration may be performed by determining correlation values between a received GPS signal (S(n)) and an expected sequence (R(n)), such as the preamble. A correlation value may be determined by multiplying a portion of the received GPS signal S(n) with an expected sequence R(n) and then determining the magnitude of the sum. In one embodiment, the correlation sum may be $$\text{Corr} = \left| \sum_N S(n) R(n) \right|$$

(N is the number of elements in the sequence). Periods of non-coherent integration may be extended to increase sensitivity to GPS signals.

The position of the preamble may be used to determine a position of a hand-over-word, which may include time of day information. In one embodiment, contents of the hand-over-word that include time of day information may be determined by computing partial correlation sums using hypothetical sequences representing possible partial values of the hand-over-word. Partial correlation sums may be calculated using the above equation where R(n) may be one or more hypothesized sequences representing possible partial values of the hand-over-word. Calculations of partial correlation sums may be continued until the time of day information may be determined.

DETAILED DESCRIPTION

Global positioning system (GPS) receivers are typically designed to provide a position, velocity, and time (PVT) solution (i.e., generate a "fix") for a user using four or more GPS satellites. In order to provide a relatively fast time-to-first-fix (TTFF, i.e., provide an initial PVT solution), a GPS receiver may include multiple acquisition and tracking channels that may work in parallel to acquire (i.e., provide an initial discrimination of a particular CA code for a GPS satellite) and track (i.e., continue to receive and discriminate particular CA codes) GPS satellites. In order to determine a fix, GPS receivers may determine a time of day by examining multiple signals from GPS satellites and solving for the time of day.

While the GPS receiver 100 may be used to provide a relatively complete PVT solution, the GPS receiver 100 may also be used to provide a partial PVT solution. For example, the GPS receiver 100 may be used as a GPS-assisted time source. As is well-known, relatively accurate time of day data is included with each GPS signal transmitted by each GPS satellite. However, the time of day data within a GPS signal may not be as accurate as a time of day determined by generating a fix. However, if a user only wanted a GPS-assisted time source, in contrast to a complete PVT solution, the GPS receiver 100 may not be a cost effective device to provide such data.

Figure 2:
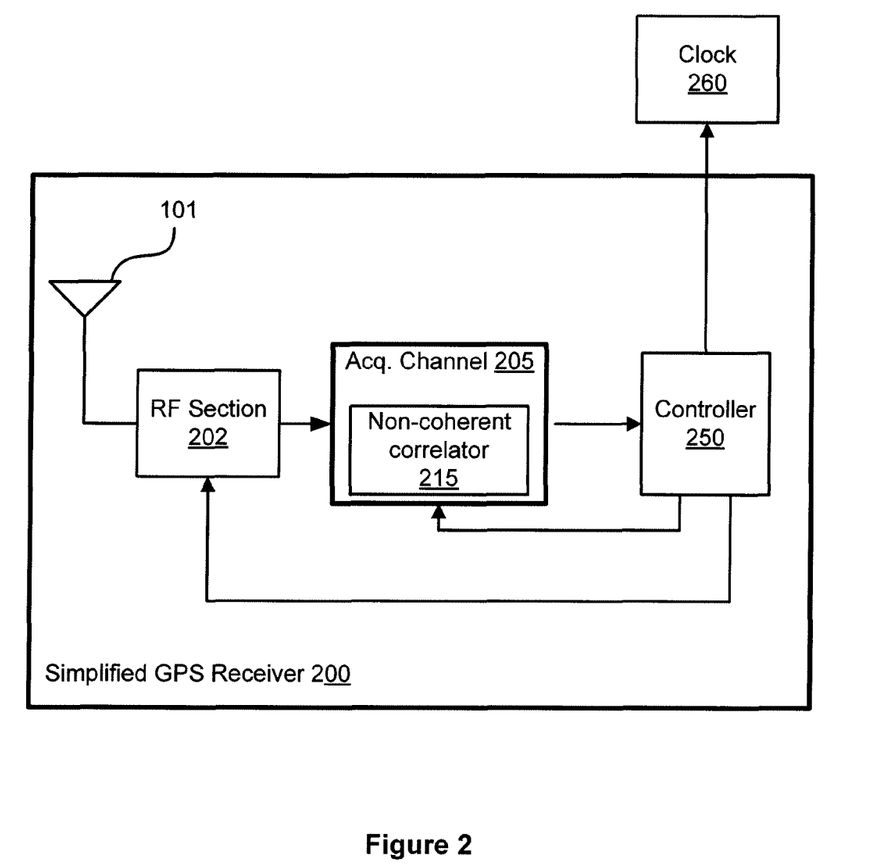
FIG. 2 is a block diagram of a simplified GPS receiver.

FIG. 2 is a block diagram of a simplified GPS receiver 200. The simplified GPS receiver may include an antenna 101, an RF section 202, an acquisition channel 205 and a controller 250. In one embodiment, the antenna 101 and the RF section 202 may be substantially similar to the antenna 101 and RF section 105 of FIG. 1.

Similar to the GPS receiver 100 of FIG. 1, the antenna 101 is coupled to the RF section 202. The antenna 101 may receive RF signals and provide those RF signals to the RF section 202. The RF section 202 may process the RF signals and may produce an intermediate frequency (IF) signal. In one embodiment, the IF signal may be produced by sampling the RF signal with an analog-to-digital converter (ADC, not shown). In another embodiment, the RF section 202 may produce an IF signal centered about 0 Hz (i.e., a baseband signal) and the ADC may sample the baseband signal.

In one embodiment, the clock source for the RF section 202 may be of a relatively lesser quality than the clock source used in the RF section 105 of FIG. 1. As is well-known, a relatively lesser quality clock source may advantageously cost less than a higher quality clock source. However, lesser quality clock sources may have looser tolerances, which may result in longer GPS satellite acquisition times. A GPS-assisted time source may advantageously have no or substantially lower TTFF requirements, and, thus may use lesser quality clock sources. The RF section 202 provides the IF signal to the acquisition channel 205. In one embodiment, the acquisition channel 205 may be substantially similar to one of the acquisition channels shown in the GPS receiver 100.

The acquisition channel 205 may acquire a single GPS satellite. The GPS signal from the acquired GPS satellite may be used to determine time of day information. Since a more complete PVT solution is not required (e.g., position information is not required), the simplified GPS receiver 200 does not need to acquire multiple (i.e., three or more) GPS satellites. For example, in another embodiment the acquisition channel 205 may acquire two GPS satellites. The two GPS satellites may be acquired serially using the same GPS receiver 200. As is well-known, a fix cannot be generated with only two GPS satellites. One advantage of simply determining time of day information is that there is much less related computational effort compared to determining a complete PVT solution. Time of day information is simply recovered from the GPS signal, while PVT information must be computed from data carried by multiple GPS signals.

In one embodiment, the acquisition channel 205 may be configured to have increased sensitivity to relatively low signal strength GPS satellite signals. For example, one method for increasing sensitivity is to increase the amount of time allocated for acquiring a GPS satellite. Typically, a GPS receiver quickly searches the known constellation of GPS satellites seeking to acquire GPS satellites and quickly provide a PVT solution for the user. Many typical GPS receivers may limit acquisition time so that the TIFF may be reduced, enhancing the user's experience. Consequently, a relatively small amount of time may be spent acquiring any one particular GPS satellite causing the acquisition channel to skip over a low strength GPS signal. Increasing the amount of time used to search for a particular GPS satellite may increase the sensitivity to relatively low signal strength GPS signals. The acquisition channel 205 may be configured to search several minutes or hours for a particular GPS satellite.

The acquisition channel 205 may include a non-coherent correlator 215. The non-coherent correlator 215 may be configured to determine portions of the received GPS signals and is described in greater detail in conjunction with FIGS. 5, 6, 8, 9, and 10.

The acquisition channel 205 is coupled to the controller 250. Once the acquisition channel 205 acquires a GPS satellite, acquisition data is provided to the controller 250. In one embodiment, the controller 250 may be a central processing unit (CPU), a microprocessor, a digital signal processor, or any other such device that may read and execute programming instructions. In another embodiment, the controller 250 may be implemented by a state machine. The controller 250 may process the acquisition data to determine time of day information.

In one embodiment, a clock 260 may be synchronized to the time of day information provided by the controller 250.

One advantage to this configuration is that although the time required for acquiring a GPS satellite and determining time of day information may be relatively long, once the clock is synchronized, the time of day information is accessible and current. In another embodiment, the clock 250 may be set to reflect a time offset related to a specific time zone.

Moreover, since a time source may be relatively motionless, the acquisition channel 205 may be advantageously configured. For example, a stationary acquisition channel may not need to compensate for GPS signal fading due to temporal signal blockers such as user movement under trees or through tunnels.

Figure 3:
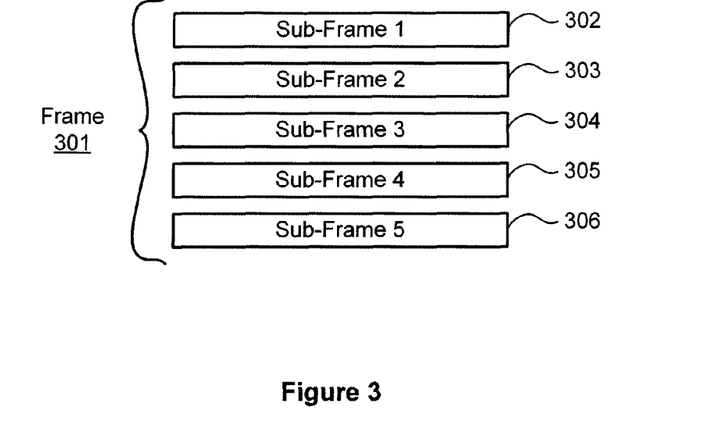
FIG. 3 is a block diagram of a GPS frame.

The acquisition channel 205 may also be configured to advantageously use the repetitive structure of the GPS signal to increase sensitivity. FIG. 3 is a block diagram of a GPS frame 301. GPS signals are formatted into GPS frames such as frame 301. Each frame 301 includes five sub-frames; a first sub-frame 302, a second sub-frame 303, a third sub-frame 304, a fourth sub-frame 305, and a fifth sub-frame 306. A GPS satellite transmits each sub-frame in sequence, continually cycling through all sub-frames.

Figure 4:
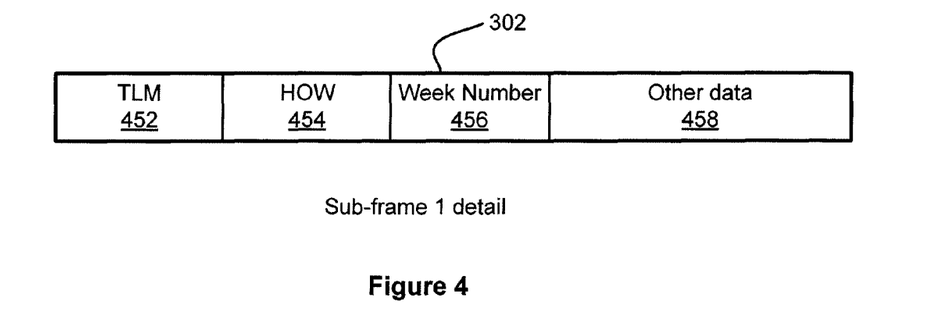
FIG. 4 is a block diagram showing details of the first sub-frame.

FIG. 4 is a block diagram showing details of the first sub-frame 302. The first sub-frame 302 includes a telemetry field (TLM) 452, a hand-over-word field (HOW) 454, a week number field 456 and other data 458. The week number field 456 includes the current week number. According to GPS convention, all weeks for a twenty-year period are numbered, starting Jan. 6, 1980. The current week number is a 10-bit field; therefore, approximately every twenty years, the current week number is reset to zero. Knowledge of the current week number is not needed, however, to determine the time of day. Time of day information is included within a time of week (TOW, not shown) portion of the HOW 454. It is interesting to note that a GPS-assisted time source may not need day of the week information since the resolution of most clocks may only be twenty-four hours (i.e., day of the week independent). Thus, relevant time information may be determined only through the TOW portion of the sub-frame. GPS satellites generally represent time of day information in a format associated with coordinated universal time (UTC). Currently, the time of day information may be offset by an integer value from UTC.

The TLM 452 and the HOW 454 fields are common to all five sub-frames 302-306 and are located in the same relative position within each sub-frame. This common positioning may be used to increase sensitivity as is described below.

Figure 5:
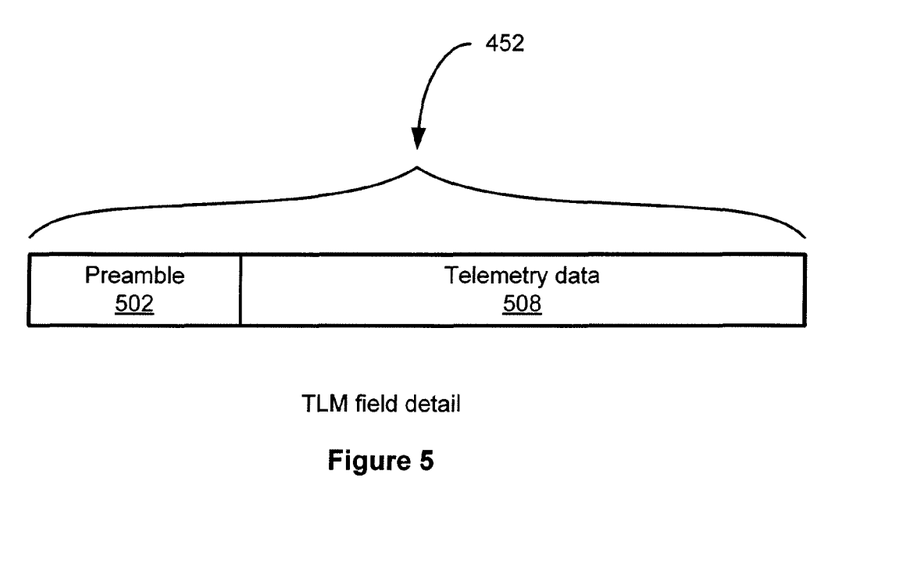
FIG. 5 is a block diagram showing the details of the TLM.

FIG. 5 is a block diagram showing the details of the TLM 452. The TLM 452 includes a preamble 502 and telemetry data 508. In one embodiment, the preamble 502 is a fixed bit pattern positioned at the beginning of each TLM 452. That is, the preamble 502 is repeated in each TLM 452 in each sub-frame. In one embodiment, the acquisition channel 205 may continually examine the sub-frames 302-306 and perform non-coherent integration on the sub-frame data until the preamble 502 may be determined. More particularly, the position of the preamble 502 within the sub-frames 302-306 may be determined with non-coherent integration.

In one embodiment, non-coherent integration may be performed by determining correlation values between a received GPS signal ($S(n)$) and an expected sequence ($R(n)$), such as a known preamble. The position of the preamble with respect to sub-frames may be determined by examining the correlation values. This is described in greater detail below.

As described above, a received GPS signal frame consists of five sub-frames. Each sub-frame may include 300 bits divided into fields. Each bit may be represented by a complex number $\pm Ae^{j\phi}$ where A is an unknown magnitude and $\phi$ is an unknown phase. The sign of the complex number can represent a bit state. For example, a "+" may represent a 0b1 and a "−" may represent and 0b0.

A correlation value may be determined by multiplying a portion of the received GPS signal S(n) with an expected sequence R(n) and then determining the magnitude of the sum. This may be shown by equation 1, wherein N is the number of elements in the sequence.

$$\text{Corr} = \left| \sum_N S(n)R(n) \right| \quad \text{(eq. 1)}$$

To illustrate the calculation, consider an eight-bit preamble 0b10001011 for R(n). Representing the preamble in complex form yields $$R(n) = [+A, -A, -A, -A, +A, -A, +A, +A]e^{j\phi} + w \quad \text{(eq. 2)}$$

where w is noise. The received GPS signal S(n) may be shown as a sequence of complex numbers as well. If a portion of S(n) includes the preamble, the signal would have the form:

$$S(n) = [+A, -A, -A, -A, +A, -A, +A, +A]e^{j\phi} \quad \text{(eq. 3)}$$

The correlation value defined by equation 1 multiplies a first element of R(n) and S(n), a second element of R(n) and S(n) and so on. Since there are eight elements in the preamble, N=8. All products are then summed and the absolute value may be determined. The correlation value is relatively larger when the signs of the like elements of R(n) and S(n) match (i.e., bit values between the received GPS signal and the preamble sequence are the same). Conversely, the correlation value is relatively smaller when the signs of the like elements of R(n) and S(n) do not match. In an alternative embodiment, the correlation value of equation 1 may be replaced with $$\text{Corr} = \left| \sum_N S(n)R(n) \right|^2 \quad \text{(eq. 4)}$$

which may yield similar results to equation 1, but may be relatively simpler to compute.

Calculating correlation values may determine the position of the preamble in the received GPS signal S(n). In one embodiment, correlation values may be determined at every sequence element in the received GPS signal S(n). When the correlation value is a relative maximal value, the position of the preamble 502 may be determined. If the received GPS signal S(n) is weak or noisy, a single correlation value may not be sufficient to determine the preamble 502 position. In one embodiment, the correlation values may be calculated by the non-coherent correlator 215 (FIG. 2).

Figure 6:
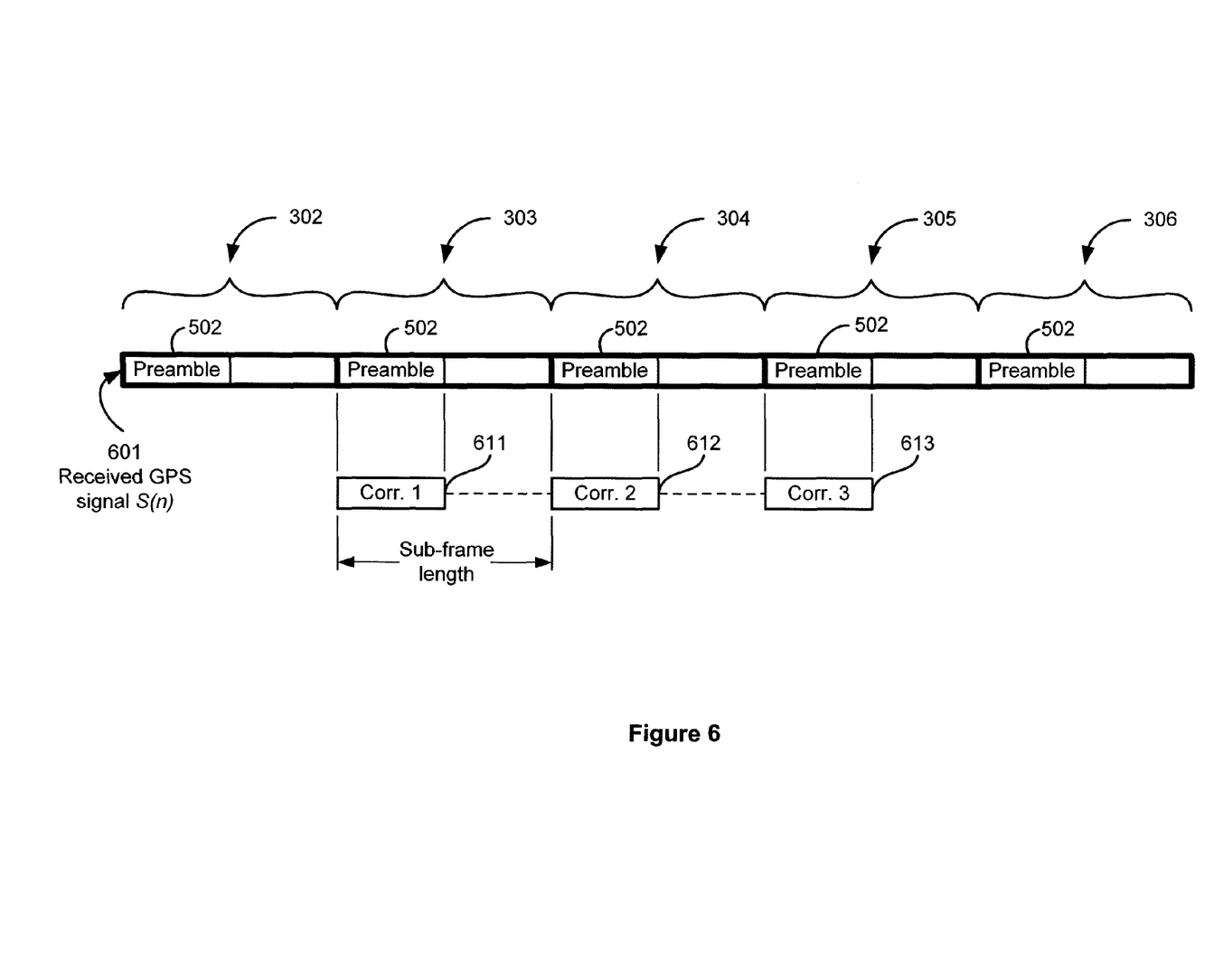
FIG. 6 is a block diagram showing the relationship between the multiple correlation values and the received GPS signal S(n)

Additional correlation values may be determined by performing the correlations of equations 1 or 4 a fixed distance from the first correlation value calculation. FIG. 6 is a block diagram showing the relationship between multiple correlation values and the received GPS signal S(n) 601. A first, second and third correlation (611, 612, and 613 respectively) are shown positioned relative to the received GPS signal S(n) 601. The first correlation 611 is shown aligned with the preamble 502 in the second sub-frame 303. Similarly, the second correlation 612 is aligned with the preamble 502 in the third sub-frame 304 and the third correlation 613 is aligned with the fourth sub-frame 305. Only a portion of the received GPS signal S(n) 601 is shown for clarity. The preamble 502 is repeated in each sub-frame at the same relative position.

Thus, two or more correlation values may be determined by equations 1 or 4 separated by a number of samples approximately equivalent to the length of a sub-frame, which, in one embodiment, may be 300 samples (bits). Two or more correlation values may be calculated and summed with respect to sample positions of the received GPS signal S(n) 601. In one embodiment, the calculated and summed correlation values are the non-coherent integration values. In other words, the correlations 611-613 may be computed by "sliding together" with respect to one or more positions of the received GPS signal S(n) 601. A relative maximum sum may correspond to the position of the preamble with respect to the received GPS signal S(n) 601. Increasing the number of correlation values used to determine the sum may increase the sensitivity to GPS signals. While only three correlations are shown in FIG. 6, two or more may be used. Noise, which may be present on the received GPS signal S(n) 601, may advantageously be averaged out when relatively more correlations are calculated to determine the correlation sum.

Figure 7:
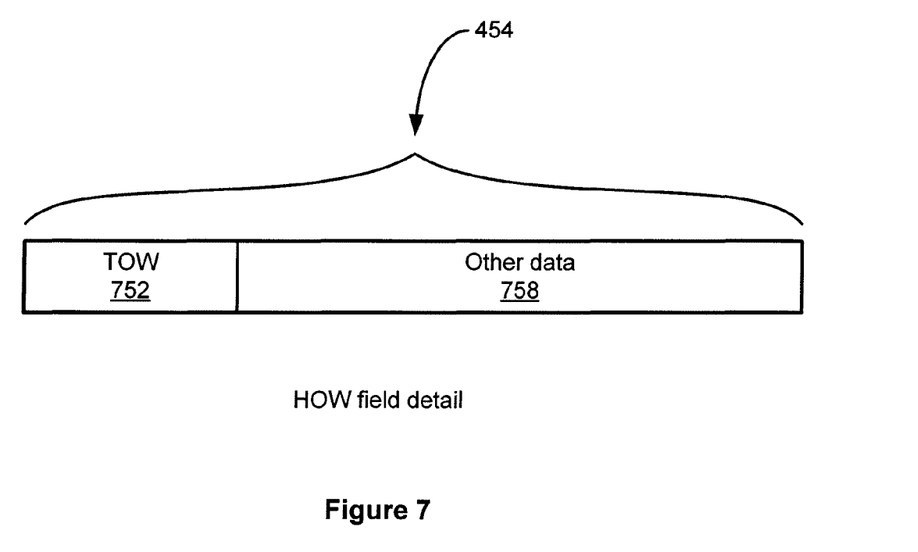
FIG. 7 is a block diagram showing the details of the HOW.

FIG. 7 is a block diagram showing the details of the HOW 454. The HOW 454 includes the TOW 752 and other data 758. The value of the TOW 752 may be determined in a similar manner as determining the position of the preamble 502 described herein. The procedure may be slightly different because the state of the TOW 752 is both constantly changing and initially unknown. The TOW 752 included in the received GPS signal S(n) 601 may be 17 bits wide, but the value of the TOW 752 is incremented each sub-frame. In addition, the initial state (i.e., the state of the bits before any time information may be determined) of any of the 17 bits of the TOW 752 may not be known, making correlation using equation 1 or 4 relatively difficult.

Partial correlation sums may be computed using partial hypothetical TOW 752 sequences. The partial correlations values may help determine portions of the TOW 752. Further, partial hypothetical TOW 752 sequences may be explored until the complete TOW 752 may be determined. This is described in conjunction with FIG. 8.

Figure 8:
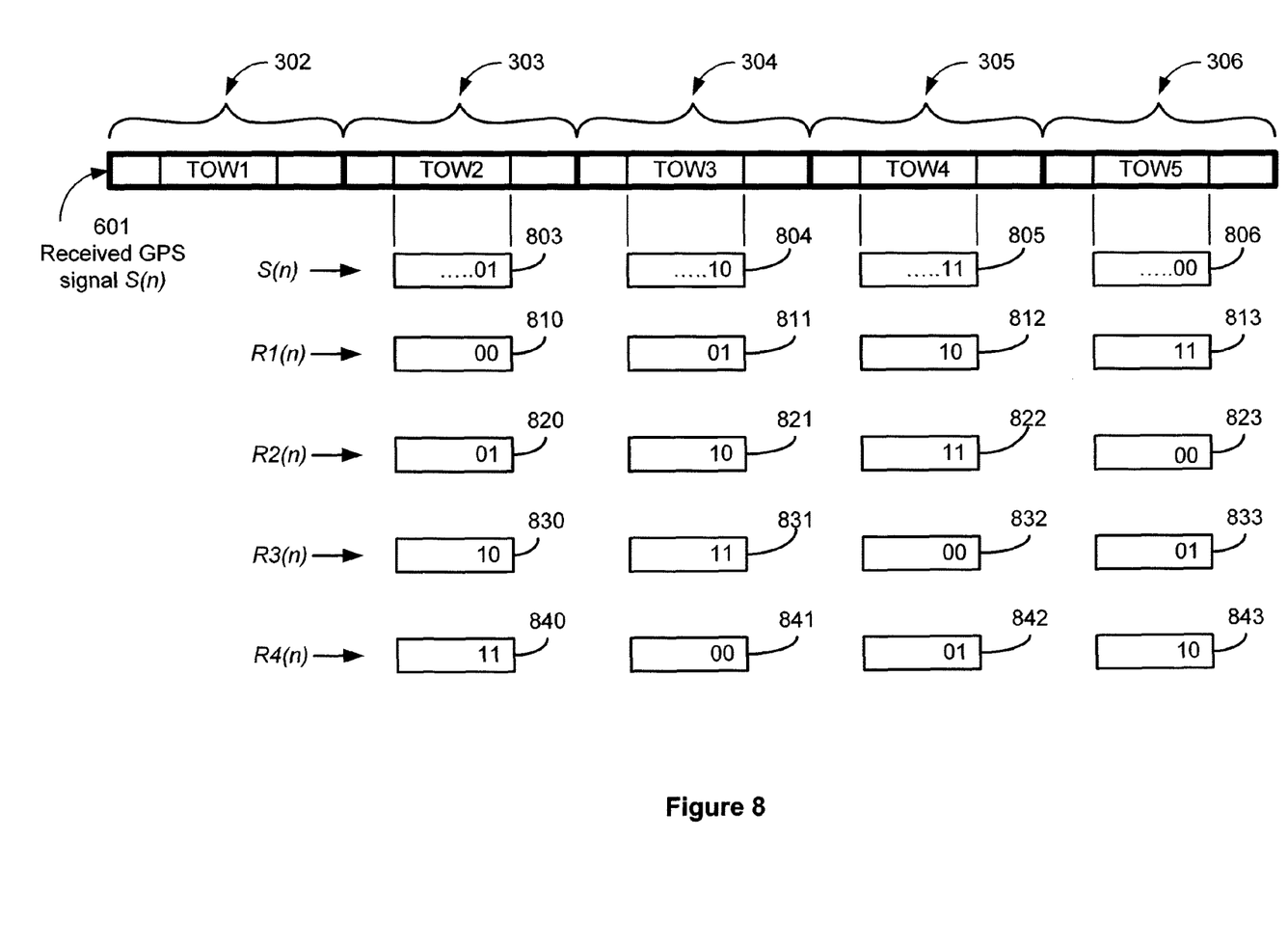
FIG. 8 is a block diagram showing the relationship between multiple hypothetical TOW sequences and the received GPS signal S(n)

FIG. 8 is a block diagram showing the relationship between multiple hypothetical TOW sequences R1(n)-R4(n) and the received GPS signal S(n) 601. The GPS signal S(n) 601 includes the first through fifth sub-frames (302-306 respectively). As described above, the sequence of sub-frames continues to repeat; however, other sub-frames are not shown here for clarity. The TOW 752 is present in each sub-frame as shown. The contents of the TOW 752 are incremented each sub-frame. Similar to the preamble 502, the TOW 752 is positioned in relatively the same position with respect to the sub-frame. Thus, the TOW 752 also occurs every 300 samples (bits). Since the position of the preamble 502 has already been determined, the position of every sub-frame and fields within each sub-frame may also be determined. Thus, the position of the TOW 752 may be determined for each sub-frame.

In order to determine the contents of the TOW 752, LSBs of the TOW 752 may be determined first. In one embodiment, the first two LSBs may be determined. The first two LSBs may be determined by calculating partial correlation sums using the received GPS signal S(n) 601 and hypothetical LSBs of the TOW 752. FIG. 8 shows four TOWs of the 803-806, with only the two LSBs of each TOW displayed.

Since the TOW 752 is incremented each sub-frame, the sequence of the two LSBs of the TOW 752 is known to be 0b00, 0b01, 0b10, and 0b11. What is not known is the particular phase of the sequence. A partial correlation sum of the LSBs of the TOW 752 with four hypothesized sequence may be calculated. Each hypothesized sequence may include possible TOW LSBs in a particular sequence representing a particular phase.

As shown, a first hypothetical sequence R1($n$) includes four possible partial TOWs 810-813 with the values 0b00, 0b01, 0b10, 0b11 respectively. A second hypothetical sequence R2($n$) includes four possible TOWs 820-823 with the values 0b01, 0b10, 0b11, 0b00 respectively. A third hypothetical sequence R3($n$) includes four possible TOWs 830-833 with the values 0b10, 0b11, 0b00, 0b01 respectively and a fourth hypothetical sequence R4($n$) includes four possible TOWs 840-843 with the values 0b11, 0b00, 0b01, 0b10 respectively.

The partial correlation sums may be calculated using equations 1 or 4, the four TOWs 803-806, and each hypothetical sequence. In this case, only two of the seventeen bits of the complete TOWs 803-806 are used in the calculation, thus, N=2 (with respect to equation 1 or 4). For example, using TOWs 803-806 and the four hypothetical TOWs 810-813, four partial correlation values may be calculated and summed. The relatively largest partial correlation sum may correspond to the hypothetical sequence most closely matching the TOWs 803-806 of the received GPS signal S(n) 601. In this example, the second hypothetical sequence R2($n$) most closely matches the phase of the received GPS signal S(n) 601 and would yield the relatively largest partial correlation value sum. Although the hypothetical sequence R2($n$) only shows four values 820-823, the partial correlation value may be determined using more than four values, in part, because the TOW fields appear in every sub-frame. For example, R2($n$) may be extended to five or more hypothetical values. Using more than four partial TOWs may increase sensitivity to GPS signals.

In one embodiment, the partial correlation values and sums may be calculated serially. That is, a first partial correlation sum may be determined using the four TOWs 803-806 and the first hypothetical sequence R1($n$). Following that calculation, a second partial correlation sum may be determined using four TOWs 803-806 and the second hypothetical sequence R2($n$). This may be repeated until all hypothetical sequences have been examined. In an alternative embodiment, all four partial correlation sums may be determined in parallel. Since there is no TIFF requirement, serial calculations may beneficially save design area and power.

In another embodiment, the hypothetical sequences may include more than two determined bits. For example, the hypothetical sequences may include the three LSBs of the TOW. In that case, the bit pattern may repeat after eight sub-frames instead of the four shown.

After determining the initial hypothetical sequence (in this example, the two LSBs of the TOW), the next bit of the TOW, adjacent to the determined LSBs, may be determined. Since there are only two possibilities for the bit, two hypothetical sequences may be used to determine partial correlation value sums. This is explained in greater detail in conjunction with FIG. 9.

Figure 9:
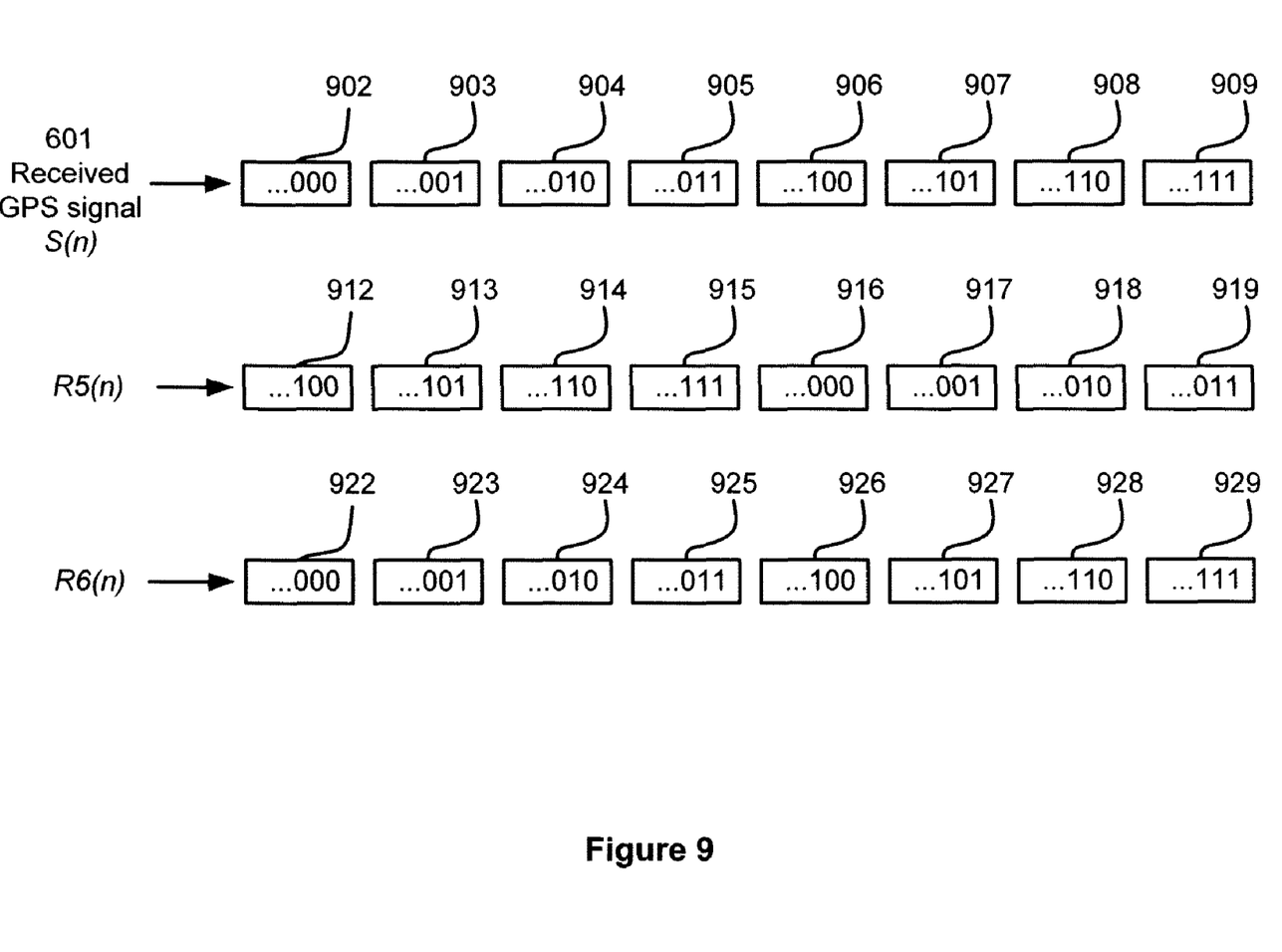
FIG. 9 is a block diagram showing the relationship between partial TOW values and two hypothetical sequences.

FIG. 9 is a block diagram showing the relationship between partial TOW values and two hypothetical sequences. As described above, the received GPS signal S(n) 601 may include a TOW field in each sub-frame. Only the TOW fields are shown here for clarity. Eight partial TOW fields included in the received GPS signal S(n) 601 are shown here 902-909. A fifth hypothetical sequence R5($n$) is shown with eight hypothesized partial TOW fields 912-919 respectively and a sixth hypothetical sequence R6($n$) is shown with eight hypothesized partial TOW fields 922-929.

Since the phase of the two LSBs of the TOW 902-909 has already been determined, the fifth and sixth hypothetical sequences may be used to determine the next LSB by calculating partial correlation sums. Note that the fifth and sixth hypothetical sequences match the two LSBs of the TOW 902-909, which were previously determined. The relatively greater partial correlation sum may correspond to the hypothetical sequence most closely matching the received GPS signal S(n) 601. Although only eight partial TOW fields are shown associated with R5($n$) and R6($n$), more than eight partial TOW fields may be used to calculate the partial correlation values.

Figure 10:
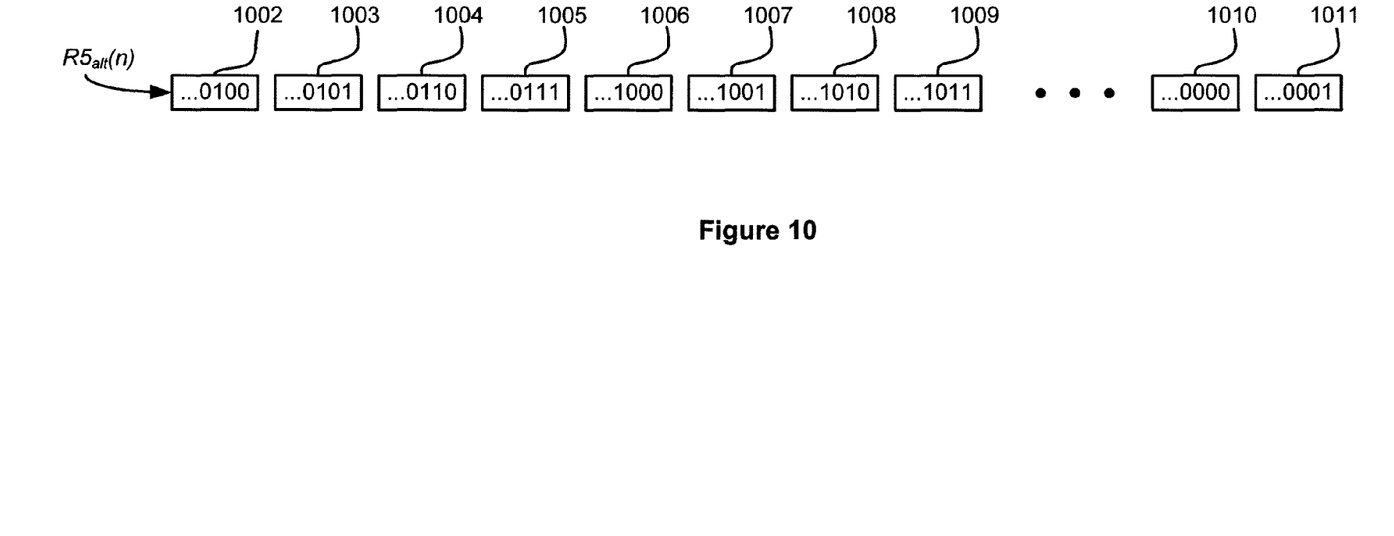
FIG. 10 illustrates an alternative fifth hypothetical sequence $R5_{alt}(n)$; and,
FIG. 11 is a flow chart of method steps for determining the TOW in a received GPS signal S(n).

The processes of adding a hypothesized bit to hypothetical sequences may be repeated until all 17 bits of the TOW are determined. In one embodiment, two hypothesized bits may be added and tested with each hypothetical phase sequence. For example, an alternative fifth hypothetical sequence R5$_{alt}$(n) may use the values for the sequence as shown in FIG. 10.

Figure 11:
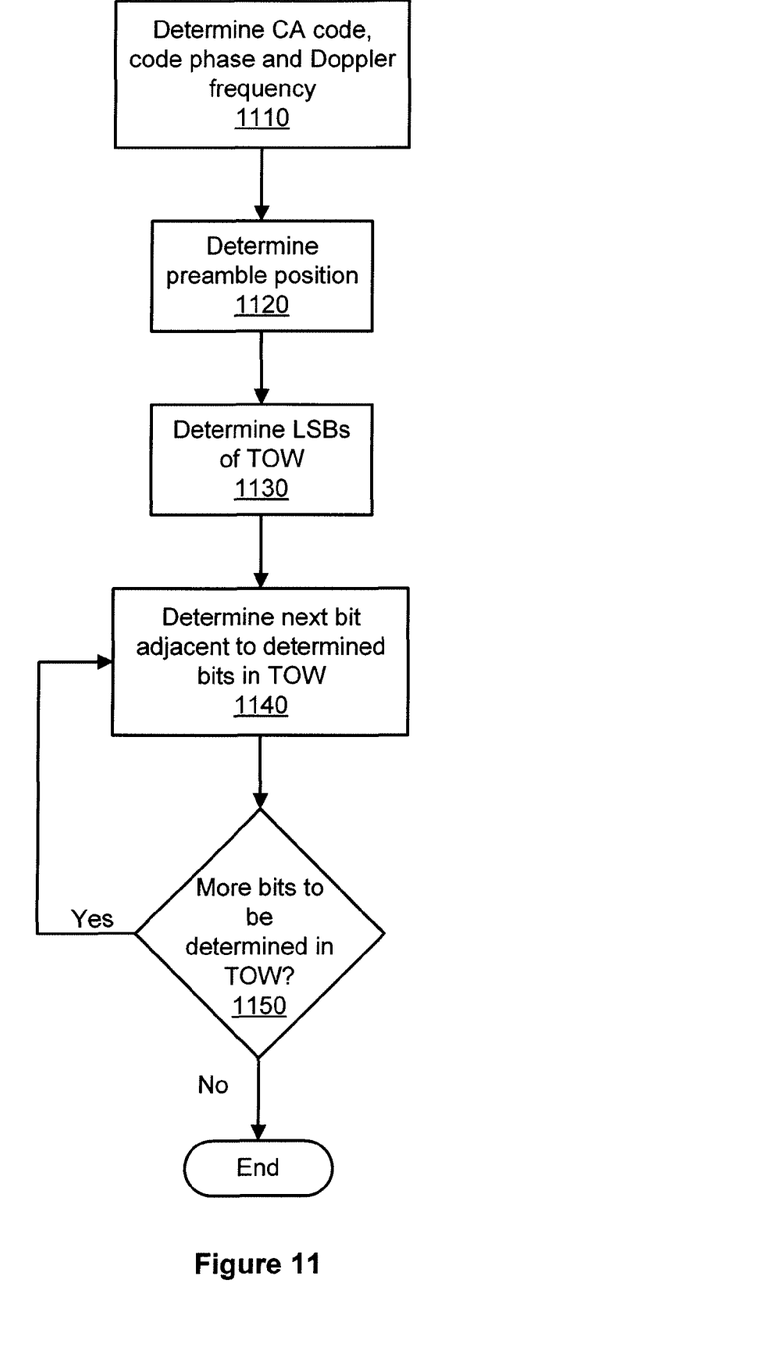

FIG. 11 is a flow chart of method steps for determining the TOW in a received GPS signal S(n) 601. The method begins as step 1110 determines the CA code, CA code phase and Doppler frequency associated with the received GPS signal S(n) 601. Methods to determine CA codes, code phases and Doppler frequencies are well-known in the art. In one embodiment, step 1110 may be performed by the acquisition channel 205.

Next, step 1120 determines the position of the preamble 502 in the received GPS signal S(n) 601. In one embodiment, the position of the preamble 502 may be determined with by the non-coherent correlator 215 as described herein. Step 1130 determines the LSBs of the TOW 752. In one embodiment, the first two LSBs may be determined using partial correlation sums determined by the non-coherent correlator 215 and hypothesized sequences as described herein. Next, step 1140 determines the next undetermined LSB of the TOW 752. In one embodiment, the next undetermined LSB of the TOW 752 also be determined using partial correlation sums and hypothesized sequences. Again, step 1140 may be performed by the non-coherent correlator 215.

Step 1150 determines if there are more bits within the TOW 752 to be determined. In one embodiment, step 1150 may be performed by the controller 250. If there are, the method returns to step 1140. If there are no more bits to be determined, the method ends.

The simplified GPS receiver 200 may have a relatively lower cost compared to the typical GPS receiver 100. This lower cost may advantageously make it attractive for use in products that could not bear the cost of a typical GPS receiver 100, such as a wall clock. In addition, the simplified GPS receiver 200 may advantageously have relatively greater sensitivity to lower signal strength GPS signals than the typical GPS receiver 100 since there.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, the method of FIG. 11 may be applied to other portions of the GPS signal that may be similar in structure to the TOW such as the sub-frame identification bits that may be located within the hand-over-word. In other embodiments, the methods and apparatus described herein may be applied to multiple received GPS signals in order to increase sensitivity to relatively low strength GPS signals. For example, referring back to FIG. 1, the acquisition channels 120A-120B may be replaced with instances of the acquisition channel 205.

Accordingly, it is intended that the scope of the invention be defined by the following claims and their equivalents.

The invention claimed is:

1. A method for determining time of day, the method comprising:
    receiving a signal from at least one of a plurality of satellites;
    determining a CA code, code phase and Doppler frequency associated with the signal; and
    determining the time of day from the signal by calculating at least one partial correlation sum without the necessity of generating a fix.

2. The method of claim 1, wherein the satellites are selected from at least one of the group of Navstar, GLONASS and Galileo.

3. The method of claim 1, further comprising:
    synchronizing a clock to the determined time of day.

4. The method of claim 1, wherein calculating at least one partial correlation sum includes:
    determining a position of a preamble in the signal; and
    determining a subset of a hand-over-word based on the position of the preamble and hypothetical sequences of the subset.

5. The method of claim 4, further comprising performing non-coherent integration on the signal to determine the position of the preamble.

6. The method of claim 4, further comprising determining a first partial correlation sum using a first portion of the signal to determine a first subset of the hand-over-word.

7. The method of claim 6, further comprising determining a second partial correlation sum using the first portion of the signal to determine the first subset of the hand-over-word.

8. The method of claim 7, wherein the first and the second partial correlation sums are determined in parallel.

9. The method of claim 7, wherein the first and the second partial correlation sums are determined in serial.

10. The method of claim 6, wherein the first partial correlation sum is determined with a first hypothetical sequence.

11. The method of claim 7, wherein the second partial correlation sum is determined with a second hypothetical sequence.

12. The method of claim 7, further comprising determining a third partial correlation sum using the first portion of the signal, a second portion of the signal, and a third hypothetical sequence to determine a second subset of the hand-over-word.

13. An apparatus for determining time of day, the apparatus comprising:
    an antenna configured to receive a signal from at least one of a plurality of satellites;
    an RF section coupled to the antenna and configured to provide a IF signal from the received signal; and
    an acquisition channel for determining a CA code, a code phase, and a Doppler frequency from the IF signal,
        the acquisition channel including a non-coherent correlator configured to calculate at least one partial correlation sum from a subset of a hand-over-word of the IF signal to determine the time of day.

14. The apparatus of claim 13, wherein the non-coherent correlator is configured to perform non-coherent integration to determine a position of a preamble within the IF signal.

15. The apparatus of claim 13, wherein the non-coherent correlator is configured to determine a first partial correlation sum on a first portion of the IF signal to determine a first subset of the hand-over-word.

16. The apparatus of claim 15, wherein the first partial correlation sum is determined with a first hypothetical sequence.

17. The apparatus of claim 15, wherein the non-coherent correlator is configured to determine a second partial correlation sum on the first portion of the IF signal and a second portion of the IF signal to determine a second subset of the hand-over-word.

18. The apparatus of claim 17, wherein the second partial correlation sum is determined with a second hypothetical sequence.

19. The apparatus of claim 17, further including a controller for determining whether there are more bits within the subset of the hand-over-word to be determined.

* * * * *